(12) United States Patent
Muhr et al.

(10) Patent No.: US 11,608,093 B2
(45) Date of Patent: Mar. 21, 2023

(54) LEVEL CONTROL SYSTEM FOR ADJUSTING THE LEVEL OF A VEHICLE

(71) Applicant: KNORR-BREMSE SYSTEME FÜR SCHIENENFAHRZEUGE GMBH, Munich (DE)

(72) Inventors: Jürgen Muhr, Grafrath (DE); Ulrich Wermund, Munich (DE); Eduard Nies, Puchheim (DE); Mark A. Sterrett, Hanover, PA (US)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 288 days.

(21) Appl. No.: 16/762,847

(22) PCT Filed: Sep. 17, 2018

(86) PCT No.: PCT/EP2018/075013
§ 371 (c)(1),
(2) Date: May 8, 2020

(87) PCT Pub. No.: WO2019/091637
PCT Pub. Date: May 16, 2019

(65) Prior Publication Data
US 2021/0031815 A1 Feb. 4, 2021

(30) Foreign Application Priority Data

Nov. 9, 2017 (EP) .................................. 17200882
Jul. 31, 2018 (DE) .................... 10 2018 118 453.0

(51) Int. Cl.
*B61F 5/22* (2006.01)
*B60G 17/027* (2006.01)

(52) U.S. Cl.
CPC ............ *B61F 5/22* (2013.01); *B60G 17/0272* (2013.01); *B60G 2300/10* (2013.01); *B60G 2500/30* (2013.01)

(58) Field of Classification Search
CPC ... B61F 5/22; B60G 2300/10; B60G 17/0272; B60G 2500/30
See application file for complete search history.

(56) References Cited

U.S. PATENT DOCUMENTS 2,606,506 A 8/1952 Sloane
3,598,422 A * 8/1971 Strauff ............... B60G 17/0272
280/6.159

(Continued)

FOREIGN PATENT DOCUMENTS

DE 10315000 A1 * 11/2003 ................ B61F 5/02
DE 102015202118 A1 8/2016
(Continued)

OTHER PUBLICATIONS

International Search Report corresponding to PCT/EP2018/075013, dated Jan. 21, 2019.

*Primary Examiner* — Laura Freedman
(74) *Attorney, Agent, or Firm* — Barnes & Thornburg LLP

(57) ABSTRACT

A level control system adjusting the level of a vehicle, in particular a rail vehicle, and includes at least one level control cylinder and a level control piston, which is at least partially movably accommodated in the level control cylinder. Accordingly, the level control piston may have a substantially continuous outer diameter.

14 Claims, 3 Drawing Sheets

(56) References Cited

U.S. PATENT DOCUMENTS

| | | | | |
|---|---|---|---|---|
| 4,750,579 A * | 6/1988 | Jarl | ............... | B66F 9/07586 180/209 |
| 5,984,286 A * | 11/1999 | Busch | ............... | B60G 17/0272 267/218 |
| 6,102,378 A * | 8/2000 | Gieseler | ............... | B61F 5/144 267/190 |
| 7,168,370 B2 * | 1/2007 | Hommen | ............... | B60G 17/0272 105/453 |
| 7,185,592 B2 * | 3/2007 | Hommen | ............... | B60G 17/0416 105/453 |
| 7,243,606 B2 * | 7/2007 | Hommen | ............... | B60G 17/0408 105/453 |
| 7,475,883 B2 * | 1/2009 | Christophel | ............... | B60G 17/021 280/5.514 |
| 7,520,494 B2 * | 4/2009 | Gaile | ............... | B60G 17/056 267/221 |
| 7,874,254 B2 * | 1/2011 | Lehmair | ............... | F16F 13/005 105/198.3 |
| 8,235,366 B2 * | 8/2012 | Anton | ............... | F16F 3/10 267/221 |
| 8,616,352 B2 * | 12/2013 | Hinouchi | ............... | B60G 17/021 267/222 |
| 8,899,160 B2 * | 12/2014 | Haas | ............... | B61F 5/22 105/164 |
| 9,315,203 B2 * | 4/2016 | Franks | ............... | B61F 5/14 |
| 10,052,928 B2 * | 8/2018 | Christoff | ............... | B60G 17/0416 |
| 10,442,448 B2 * | 10/2019 | Monette | ............... | B61F 5/06 |
| 10,543,857 B2 * | 1/2020 | Dausoa | ............... | B61F 5/16 |
| 10,882,541 B2 * | 1/2021 | Kremmel | ............... | B61F 5/06 |
| 11,198,456 B2 * | 12/2021 | Leitgeb | ............... | B61F 5/127 |
| 11,352,029 B2 * | 6/2022 | Sterrett | ............... | B60G 17/0272 |
| 11,420,657 B2 * | 8/2022 | Muhr | ............... | B61F 5/22 |
| 11,459,001 B2 * | 10/2022 | Nies | ............... | B61F 1/14 |
| 2003/0107161 A1 | 6/2003 | Teichmann et al. | | |
| 2019/0315381 A1 * | 10/2019 | Clavier | ............... | B61F 5/245 |
| 2020/0130714 A1 * | 4/2020 | Nies | ............... | B60G 17/0272 |
| 2020/0307656 A1 * | 10/2020 | Sterrett | ............... | B60G 17/0272 |
| 2020/0353958 A1 * | 11/2020 | Wermund | ............... | B61F 5/22 |
| 2020/0361500 A1 * | 11/2020 | Muhr | ............... | B61F 1/14 |

FOREIGN PATENT DOCUMENTS

| | | |
|---|---|---|
| WO | 2011032850 A1 | 3/2011 |
| WO | 2012115927 A1 | 8/2012 |

* cited by examiner

LEVEL CONTROL SYSTEM FOR ADJUSTING THE LEVEL OF A VEHICLE

CROSS REFERENCE AND PRIORITY CLAIM

This patent application is a U.S. National Phase of International Patent Application No. PCT/EP2018/075013 filed Sep. 17, 2018, which claims priority to German Patent Application No. 10 2018 118 453.0 and claims priority to European Patent Application No. 17200882.3, the disclosure of which being incorporated herein by reference in their entireties.

FIELD

Disclosed embodiments relate to a level control system for adjusting the level of a vehicle, in particular a rail vehicle, having at least one level control cylinder and one level control piston, wherein the level control piston is at least partially movably received in the level control cylinder.

BACKGROUND

It is known that level control systems for rail vehicles enable adjustment of the height between the bogie and the vehicle superstructure for the purposes of regulating the height of the superstructure of the rail vehicle.

SUMMARY

In accordance with disclosed embodiments, a level control system is provided for adjusting the level of a vehicle, in particular a rail vehicle, having at least one level control cylinder and one level control piston is provided, wherein the level control piston is at least partially movably received in the level control cylinder, wherein the level control system has at least one multi-layer spring, and wherein the level control piston has a substantially continuous outer diameter.

BRIEF DESCRIPTION OF THE FIGURES

Further details and advantages of the disclosed embodiments will now be discussed with reference to exemplary embodiments illustrated in more detail in the drawings. In the drawings.

DETAILED DESCRIPTION

Figure 1:
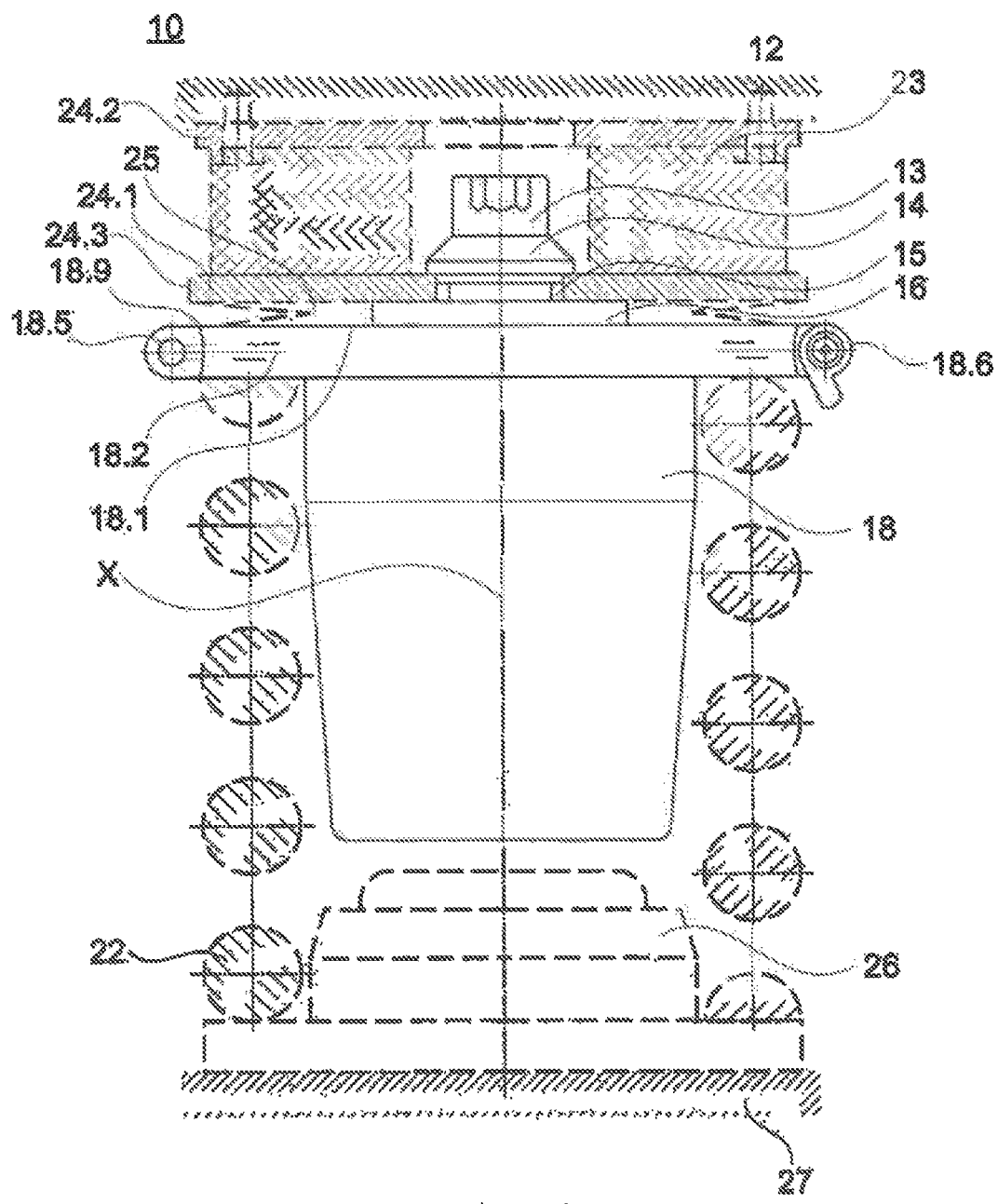
FIG. 1 shows a schematic front view of an exemplary embodiment according to the disclosed embodiments of a level control system with a level control cylinder and with a level control piston in the retracted state.

DE 103 15 000 A1 has disclosed a device for secondary suspension. For the secondary suspension, a spring element is provided between the bogie and the car body, which spring element may be an active hydraulic spring, gas spring or the like or else a passive spring in the form of a steel spring or the like designed in the manner of a compression spring. A pulling cylinder is provided between the bogie and the car body for the spring element, with which pulling cylinder a restoring force acting counter to the force of the spring element can be generated in order to bring the car body from the raised travel level to a lowered platform level (loading/unloading position) and to hold said car body there. A deactivation of the pulling cylinder has the effect that the car body moves back to the raised travel level by the restoring force of the spring stage. The pulling cylinder is in this case a hydraulic cylinder which can be pressurized in a single-acting manner. In order to effect the pulling action, that is to say in order that the piston rod plunges into the cylinder body of the pulling cylinder in the event of charging with pressure medium, the internal piston is charged with pressure medium at a cylinder cover side.

U.S. Pat. No. 9,315,203 B2 has likewise disclosed a level control system for a rail vehicle, which level control system can raise the car body of the rail vehicle using hydraulic cylinders. Here, the hydraulic cylinders are connected to the bogie of the rail vehicle.

Disclosed embodiments provide a level control system of the type mentioned at the outset in an advantageous manner, in particular such that a space-saving level control system is provided which enables the level of the vehicle to be adjusted and permits efficient and cost-effective installation and maintenance.

In accordance with disclosed embodiments, a level control system is provided for adjusting the level of a vehicle, in particular a rail vehicle, having at least one level control cylinder and one level control piston is provided, wherein the level control piston is at least partially movably received in the level control cylinder, wherein the level control system has at least one multi-layer spring, and wherein the level control piston has a substantially continuous outer diameter.

Disclosed embodiments are based on the basic idea that the installation of a level control system can be both simplified and optimized in terms of its functionality using an integral construction, in particular of the level control cylinder. Furthermore, disclosed embodiments is based in particular on the basic idea that the level control piston is designed without a collar, that is to say with a substantially continuous outer diameter. In this way, the level control system can be of axially shorter construction, and/or have a lower overall height, in the region of the end of the level control piston. According to a further basic idea of the disclosed embodiments, the substantially continuous outer diameter of the level control piston has no hydraulic connectors. Accordingly, the level control piston has a substantially continuous outer diameter without a collar and/or hydraulic connectors.

Furthermore, a decisive, significant reduction of the structural space height of the level control system, in particular in the region of the level control piston and of the level control cylinder, can be achieved. Accordingly, the structural space height and also a minimum lifting height can, using an integral construction of the components, be reduced to approximately half of the originally required structural space of a lifting cylinder.

In particular, a space-saving construction and simplified production of the level control system can be achieved. Functional characteristics of the level control system are optionally contained or integrated directly in the geometrical construction of the level control cylinder and/or of the level control piston.

Furthermore, simplified handling of the level control system can be provided not only during operation, for example in the form of the hydraulic connectors integrated in the level control cylinder. Rather, the maintenance and servicing of the level control system can also be optimized by virtue of the level control system being constructed with a smaller number of components and so as to be easily accessible.

Consequently, the advantages of a level control system according to disclosed embodiments are noticeable not only during the running time of the level control system, but also in the course of the production, installation and maintenance of the system, in particular with regard to simplified handling of the system.

According to disclosed embodiments, the level control piston is provided so as to be at least partially movable in the level control cylinder for the purposes of adjusting the level of the rail vehicle.

The level control piston is, correspondingly to a conventional lifting cylinder, arranged movably within the level control cylinder.

The level control cylinder is optionally designed as a hydraulically actuatable level control cylinder.

In a retracted state of the level control system, the level control piston is optionally arranged or received entirely within the level control cylinder.

Alternatively, the level control piston is, in the retracted state, arranged at least partially or mostly within the level control cylinder.

In an extended state of the level control system, the level control piston is arranged partially or mostly outside the level control cylinder. A stroke is thus provided between the retracted and the extended state of the level control system.

According to one embodiment, the level control system has at least one multi-layer spring which, in the installed state, is arranged above and/or below the level control cylinder.

It is further provided that the level control system has at least one multi-layer spring which is arranged above the level control piston.

In this way, a spring unit, optionally a multi-layer spring, is available between the level control piston and the car body for the purposes of compensating vibrations during travel.

Alternatively or in addition, provision may be made whereby the level control piston is attached to the car body (for example to the cradle, to the carrier, etc.) of the rail vehicle directly, that is to say without the intermediate arrangement or interposition of the multi-layer spring. In other words, the arrangement of the multi-layer spring in this manner can be dispensed with for certain types of application (for example a simpler and less expensive design) of the level control system.

The level control piston is consequently connected directly to the car body if no multi-layer spring is present. Alternatively or in addition, the level control piston is likewise connected directly to the car body if the multi-layer spring is arranged below the level control cylinder.

In the context of disclosed embodiments, above the level control piston is to be understood to mean that the multi-layer spring is positioned in the lifting direction of the level control piston.

Depending on the installation position of the level control system, the positioning above the level control piston is therefore always to be understood to mean the arrangement in the lifting direction of the level control system.

The multi-layer spring is optionally arranged between a car body of the vehicle and the level control piston.

Alternatively or in addition, provision may likewise be made whereby, in the installed state of the level control cylinder, the multi-layer spring is also arranged below the level control cylinder or below a compression spring on a bogie of the vehicle, if the level control cylinder is additionally coupled to a compression spring.

Provision is furthermore made whereby the level control piston has a substantially constant or continuous outer diameter.

The level control piston is provided in particular as an elongate cylinder which is suitable for acting as a piston for a lifting cylinder.

The substantially constant outer diameter optionally relates to the general outer dimensions of the level control piston.

The level control piston is, along its outer diameter, configured at least substantially as a cylindrical main body.

In this context, the level control piston has no collar or a similar shoulder which extends substantially beyond the radial circumference of the level control piston.

The lateral surface or circumferential surface of the level control piston is optionally designed as a substantially uniform or planar surface.

Deviating from the substantially constant outer diameter, the level control piston may, in the context of disclosed embodiments, have grooves or similar depressions along its outer circumference in the lower region (in relation to its installed state), for example for the purposes of permitting a suitable fluid transfer into the inner diameter of the level control cylinder.

In this way, a level control piston is available which is easy to produce and easy to handle in the context of the level control system according to the disclosed embodiments. Since the level control piston has no collar or a similar shoulder, the structural space height can be significantly reduced.

In particular, the structural space height of the level control system can be significantly reduced using the level control piston with substantially constant outer diameter.

The required structural space height of the level control system according to the disclosed embodiments with a collarless level control piston can optionally be reduced to approximately half of an original structural space height, conventionally provided for level control systems, in the region of the level control piston and of the level control cylinder.

Owing to this greatly reduced structural height, it is possible to integrate the level control cylinder into existing vehicle concepts without significant redesign.

Functional components of the level control system, such as fluid channels or seals, may be provided or integrated in the level control cylinder.

Consequently, disclosed embodiments are able to create a simplified and effective embodiment of a level control system using an advantageous construction, which in particular provides a space-saving and, optionally, integral arrangement or configuration of the components.

According to one embodiment, the level control system has a first fixing disk and a second fixing disk, wherein the first fixing disk is arranged on the level control piston and the second fixing disk is arranged on the car body of a vehicle or rail vehicle. In this context, provision may likewise be made whereby the first fixing disk is designed as a lower base plate and the second fixing disk is designed as an upper base plate (in each case in relation to their installed state).

In this way, an advantageous pressure distribution between the level control piston and the vehicle or the car body can take place in order to introduce a lifting force for executing a lifting movement onto the car body in an expedient manner Using the first fixing disk on the level control piston, a lifting force can be transmitted over an enlarged area in the direction of the vehicle or of the car body.

Furthermore, the first and second fixing disks constitute system boundaries or system transitions, which allow a targeted introduction and transmission of forces over a defined area of the fixing disks.

According to a further embodiment, provision is made whereby the multi-layer spring is arranged between the first and second fixing disks.

Forces between the level control piston and the car body can thus advantageously be coupled into the multi-layer spring, and damped, over a specific area. In particular, proceeding from the level control piston, a force distribution is realized over a larger area in the form of the first fixing disk.

Movements or the like that are introduced via the first fixing disk, in particular abrupt movements owing to track unevennesses during the operation of, for example, a rail vehicle, can be cushioned or dampened using the multi-layer spring. Resulting movements or forces that cannot be dampened are transmitted from the multi-layer spring into the second fixing disk and transferred to the car body.

Using the multi-layer spring between the first and second fixing disks, in particular as a primary spring, an advantageous decoupling of the car body from, for example, track unevennesses is possible, wherein level control using the level control system according to the disclosed embodiments is available.

According to a further embodiment, a single fastening element is provided for connecting the level control piston to the level control cylinder.

In particular, the fastening element is provided such that the level control cylinder and the level control piston can be indirectly connected or coupled to one another.

Accordingly, the connection using the one fastening element can be understood in particular to mean an expedient assembling of the level control cylinder and of the level control piston.

The single fastening element is optionally arranged centrally, in particular along a longitudinal axis of the level control cylinder or of the level control piston.

In the context of disclosed embodiments, the longitudinal axis may be understood as a common longitudinal axis of the level control cylinder and of the level control piston, wherein a lifting movement of the level control piston takes place along the longitudinal axis.

Using a single fastening element, a low level of installation effort or maintenance effort is required for the level control system.

Furthermore, a uniform connecting force or contact pressure can be achieved in the course of the expedient connection of the level control piston to the level control cylinder for the purposes of providing a suitable lifting cylinder.

In particular, a coupling of the level control cylinder to the level control piston is provided using the fastening element such that the level control piston is at least partially movably received in the level control cylinder.

Optionally, only one fastening element is required for the connection or for the assembling of the level control piston with the level control cylinder.

In this way, the effort required for the production or for the assembling and/or for the maintenance of the level control system according to the disclosed embodiments can be advantageously reduced.

Furthermore, in the context of disclosed embodiments, the level control cylinder and the level control piston are connected or coupled to one another such that a relative movement of the level control piston is possible up to a maximum range of movement or up to a maximum stroke.

Accordingly, provision is made whereby, using the fastening element, a non-positively and/or positively locking connection is present when the level control piston reaches a maximum range of movement with respect to the level control cylinder.

In particular, the fastening element causes this non-positively and/or positively locking connection indirectly, optionally in interaction with at least one guide element.

It is thus conceivable that the fastening element positions the at least one guide element between the level control cylinder and the level control piston in such a way that a stop is reached beyond a maximum range of movement or stroke of the level control piston.

According to a further embodiment, provision is made whereby the level control piston has a central bore which is designed to receive the fastening element.

Provision is optionally made whereby the fastening element is arranged centrally within the piston or the level control system.

Accordingly, the level control system, in particular the level control cylinder and the level control piston, can be expediently connected or coupled or assemblable using a single fastening element.

Furthermore, using the central arrangement of the bore for the one fastening element, a significant reduction of the structural space can be achieved.

According to a further embodiment, at least one guide element is provided which, in conjunction with the fastening element, is positioned such that the level control cylinder provides a first and a second end stop for the relative movement of the level control piston with the at least one guide element.

In particular, in the assembled state of use of the level control system, the at least one guide element is, using the fastening element, provided in a position such that the guide element projects out of the level control piston.

The at least one guide element can optionally be displaced using the fastening element into a position such that the guide element is fixed and projects beyond the outer diameter of the level control piston.

In particular, at least two guide elements may be provided which project beyond the outer diameter of the level control piston on opposite sides thereof.

The at least one projecting guide element can engage into the level control cylinder, such that end stops are provided in the course of the relative movement between the level control cylinder and the level control piston.

At least one end stop is provided by a connection or an interaction between the fastening element in the level control piston, the at least one guide element and the level control cylinder.

According to one embodiment, the guide element is provided so as to project out of the level control piston such that the guide element engages into a corresponding guide groove of the level control cylinder in order to provide a predefinable relative movement between level control piston and level control cylinder.

In particular, any desired and expedient relative movement between the level control cylinder and the level control piston can be predeterminable using corresponding guide grooves along the inner diameter of the level control cylinder.

According to one embodiment, the guide element and the corresponding guide groove interact as a linear guide for the level control piston such that the level control piston, at its maximum stroke, can be caused to abut axially against the first end stop and, at its minimum stroke, can be caused to abut axially against the second end stop and is received movably in the level control cylinder in a manner secured against rotation.

It is thus possible, for example, for a relative rotation between level control cylinder and level control piston to be preventable using guide grooves which run in a straight or rectilinear manner.

According to a further embodiment, the fastening element is a screw or a bolt.

The fastening element is optionally provided as a screw.

It is thus possible for the fastening element in screw form to be screwable into the central bore of the level control piston in order to realize expedient assembling of the level control piston and of the level control cylinder.

In this context, the central bore of the level control piston can be provided as a bore which is at least partially configured with an internal thread.

Alternatively, the fastening element may be configured as a bolt.

The fastening element in the form of a bolt may be fastened within the central bore of the piston for example using a releasable clamping connection.

It is also conceivable that the bolt is secured, at its head, using further screws, pins or the like, such that expedient use of the level control system is possible.

According to one embodiment, the multi-layer spring is arranged around the fastening element in order to connect the first fixing disk to the level control piston.

In particular, the multi-layer spring is arranged around the fastening element such that the structural space in the center of the multi-layer spring can simultaneously be utilized for the arrangement of the fastening element.

An advantageous reduction in structural space is available using the multi-layer spring of the level control system according to the disclosed embodiments.

According to a further embodiment, the first fixing disk is of ring-shaped, in particular circular-ring-shaped, design.

Such a ring-shaped design of the first fixing disk permits a particularly compact and structural-space-optimized fastening to the level control piston. Finally, the single fastening element can be used for fastening the first fixing disk, such that no further fastening elements are necessary, or these can be omitted.

According to a further embodiment, the multi-layer spring is designed as a ring-shaped multi-layer spring.

In particular, provision may thus be made whereby the multi-layer spring is arranged as a ring-shaped multi-layer spring around the fastening element.

The fastening element may be positioned in a central cavity within the multi-layer spring in order to achieve advantageous utilization of the structural space between the first and second fixing disks.

According to one embodiment, the level control cylinder has at least one collar-like, or collared, shoulder along its open cylinder side, wherein, in particular, the collar-like shoulder has at least one first radially or tangentially arranged hydraulic connector and at least one second radially or tangentially arranged hydraulic connector.

The arrangement of the hydraulic connectors radially or tangentially on the collar-like shoulder permits in particular a reduced structural space requirement in the axial direction. If the hydraulic connectors are provided using the tangential arrangement, the structural space requirement in the radial direction for the components and for the accessibility thereto is also greatly reduced.

It is furthermore conceivable, for the purposes of reducing the contact pressure on the first fixing disk, for a holding disk to be arranged or present between the head of the fastening element (for example a screw head) and the first fixing disk.

In addition, provision may be made whereby several pins are provided for the positioning of the multi-layer spring. Accordingly, the pins assist in the transmission of a rotational torque that may be present from the level control piston to the multi-layer spring when the frictional engagement between level control piston and multi-layer spring is overcome.

It is also conceivable that the level control piston provided without a piston collar is supported with its piston end directly on the first fixing disk. In this way, the hydraulic connectors on the level control piston can be omitted and can instead be arranged or provided on the collar-like shoulder of the level control cylinder.

In this regard, it is furthermore conceivable that a retractable and extendable corrugated bellows (for keeping dirt out) is fastened in a sealing manner between the collar-like shoulder of the level control cylinder and the first fixing disk.

In this context, according to one embodiment, the level control system has at least one bellows, which is arranged between the collar-like shoulder of the level control cylinder and the first fixing disk.

In particular, the bellows is provided between the collar-like shoulder and the first fixing disk such that the level control cylinder and the level control piston are protected against contamination or the like.

According to a further embodiment, the collar-like shoulder of the level control cylinder and/or the first fixing disk has a receiving groove for receiving the bellows.

The bellows may accordingly optionally be arranged and fastenable along the collar-like shoulder of the level control cylinder and along the first fixing disk. The bellows can thus be driven along and also securely positioned in the course of a lifting movement of the level control system.

In particular, the respective receiving groove may be configured as an encircling receiving groove.

The bellows may be configured with a bead or the like in order to ensure secure engagement into the receiving groove of the level control cylinder and of the first fixing disk.

The bellows can thus be securely received and positioned along the level control cylinder and the first fixing disk, even in the course of a relative movement between the level control cylinder and the first fixing disk or the level control piston.

According to yet a further embodiment, the bellows has a stiffening element such that the bellows is detachably fixed in the receiving groove of the level control cylinder and/or of the first fixing disk.

The bellows is in particular also detachably and rotatably fixed in these respective receiving grooves.

In particular, along a circumference of the bellows, a stiffening element may be provided in an integrated manner such that the bellows can be securely fixed in the respective receiving groove.

In this context, the stiffening element is optionally inserted in the bellows or bellows material. In particular, the stiffening element is arranged in the bellows so as not to be visible from the outside.

The stiffening element may be configured as a single-piece ring. Alternatively, the stiffening element may be composed of a multiplicity of individual elements.

The stiffening element is configured such that it is possible to achieve expedient dimensional stability of the bellows for engagement into the respective receiving groove.

Expedient local stiffening of the bellows can be provided using the stiffening element. The bellows can thus engage securely into the respective receiving groove.

In this way, using the stiffening element, an integrated stiffening function for stabilizing the bellows and an integrally configured securing function are provided.

The stiffening element may in particular be a vulcanized metal ring or a similar expediently usable material in the context of a vehicle, in particular of a rail vehicle. In summary, using the level control system according to the disclosed embodiments, a space-saving and structural-height-optimized design is available, which permits simplified and inexpensive production and maintenance of the system. Expedient level control of a vehicle, in particular of a rail vehicle, is thus available.

FIG. 1 shows a schematic front view of an exemplary embodiment of a level control system 10 with a level control cylinder 18 and with a level control piston 16 in the retracted state.

The level control piston 16 is, in FIG. 1, in the retracted state in an end position with the minimum stroke, or no stroke, of the level control system 10.

The level control system 10 is, according to FIG. 1, provided on a vehicle or a rail vehicle or a car body 12.

For example, the level control system 10 is configured with a first fixing disk 24.1, a second fixing disk 24.2 and an interposed multi-layer spring 23.

The multi-layer spring 23 is provided, for example, as a ring-shaped multi-layer spring.

Other structural forms of the multi-layer spring 23 may likewise be conceivable within the scope of this disclosed embodiments.

The level control system 10 is fastened to the rail vehicle or to the car body 12 using the second fixing disk 24.2.

An expedient connection between the multi-layer spring 23, the second fixing disk 24.2 and the car body 12 with the level control piston 16 is provided using the first fixing disk 24.1.

In particular, a single fastening element 13 projects into the level control piston 16.

The fastening element 13 is arranged centrally in the level control system 10 or the level control piston 16 and the level control cylinder 18.

An expedient connection of the level control piston 16 to the level control cylinder 18 is available using the single, centrally arranged fastening element 13.

In this way, the installation or maintenance effort and a structural space saving can be achieved.

The fastening element 13 is arranged with a holding disk or washer 14 on the first fixing disk 24.1, in particular using a head of the fastening element 13.

The first fixing disk 24.1 can thus be connected in an expedient manner to the level control piston 16 using the single, centrally arranged fastening element 13.

The first fixing disk 24.1 is otherwise of circular-ring-shaped design.

The head of the fastening element 13 is positioned within the ring-shaped multi-layer spring 23.

In this way, the structural space along the multi-layer spring 23 can be advantageously utilizable for the centrally arranged fastening element 13.

A reduction in the structural space required for the level control system 10 is possible.

Furthermore, at least two pins 15 are provided according to FIG. 1, which pins, below the holding disk 14, project through the first fixing disk 24.1 into the level control piston 16.

Using the pins 15, the first fixing disk 24.1 is connected to the level control piston 16 in a rotationally secured and positionally oriented manner.

The level control cylinder 18 is configured with an open cylinder side 18.1 from which the level control piston 16 can project or slide out. A stroke or a height adjustment of the level control system 10 can thus be achieved.

Furthermore, the level control cylinder 18 has a collar-like shoulder 18.2 along the open cylinder side 18.1. The collar-like shoulder or circumference 18.2 of the level control cylinder 18 is configured as a shoulder in relation to the cylindrical basic shape of the level control cylinder 18.

A bellows 25 is arranged between the collar-like shoulder 18.2 of the level control cylinder 18 and the first fixing disk 24.1.

The bellows 25 is configured between the collar-like shoulder 18.2 and the first fixing disk 24.1 such that the level control system 10, in particular the level control cylinder 18 and the level control piston 16, are protected against contamination.

A first and a second hydraulic connector 18.5 and 18.6 are furthermore arranged along the collar-like shoulder 18.2 of the level control cylinder 18.

In particular, bosses are provided along the collar-like shoulder 18.2 of the level control cylinder 18, onto which or in which bosses the first and second hydraulic connectors 18.5 and 18.6 are integrally formed or received.

The bosses may be designed as a cutout or milled-out portion for receiving the first and second hydraulic connectors 18.5 and 18.6.

In FIG. 1, the bosses are provided such that they project beyond the outer diameter of the collar-like shoulder 18.2.

The first and second hydraulic connectors 18.5 and 18.6 can thus receivable, insertable and positionable in the bosses.

With respect to the longitudinal axis X of the level control cylinder 18, the hydraulic connectors 18.5 and 18.6 can be positioned in a tangentially running manner on the collar-like shoulder 18.2, in particular on the circular outer diameter of the collar-like shoulder 18.2, using the first and second bosses.

In relation to the disk-shaped main body of the collar-like shoulder 18.2 and/or the longitudinal axis X of the level control cylinder 18, the first and second hydraulic connectors 18.5 and 18.6 tangentially adjoin the collar-like shoulder 18.2.

Consequently, external fluid lines can be advantageously connected in terms of flow tangentially to the level control cylinder 18, in particular to the first and second hydraulic connectors 18.5 and 18.6.

The hydraulic connectors 18.5 and 18.6 may be connected in non-positively and/or positively locking fashion to the bosses of the collar-like shoulder 18.2.

In particular, the hydraulic connectors 18.5 and 18.6 may be welded, adhesively bonded, screwed or clamped to or on the bosses of the collar-like shoulder 18.2, pressed into the bosses, or the like.

The first and second hydraulic connectors 18.5 and 18.6 may be formed as one part or as several parts with the collar-like shoulder 18.2 of the level control cylinder 18.

In the context of disclosed embodiments, the hydraulic connectors 18.5 and 18.6 are always configured and arranged such that external fluid lines can be connected in a tangential form to the level control system 10.

The first hydraulic connector 18.5 may be provided as an inflow or fluid inlet.

The second hydraulic connector 18.6 may be configured as an outflow or fluid outlet or as a drain valve.

In this context, a configuration of the second hydraulic connector 18.6 as a pressure relief valve is also conceivable.

Furthermore, the first and second hydraulic connectors 18.5 and 18.6 can be usable in an inverted manner with regard to their function.

It is also conceivable that one of the hydraulic connectors 18.5 and 18.6 is used both as a fluid inlet and a fluid outlet, while the other can be used, for example, as a pressure relief valve.

The configuration of the collar-like shoulder or circumference 18.2, in particular the layer thickness of the shoulder 18.2, is based in particular on the size of the first and second hydraulic connectors 18.5 and 18.6.

Thus, the collar-like shoulder 18.2 may be designed with any desired collar thickness in a manner dependent on the application-specific requirements.

In particular, the configuration of the first and second hydraulic connectors 18.5 and 18.6 is decisive for the provided thickness of the collar-like shoulder 18.2.

In this way, a structural-space-saving configuration of the level control system 10, and in particular of the level control cylinder 18, can be provided.

Furthermore, the level control system 10 according to FIG. 1 is connected to a running gear 27 via a stop buffer 26.

In this context, the running gear 27 may be designed as a bogie or may have a bogie.

A spiral spring 22 is arranged between the stop buffer 26 and the level control cylinder 18.

Figure 2:
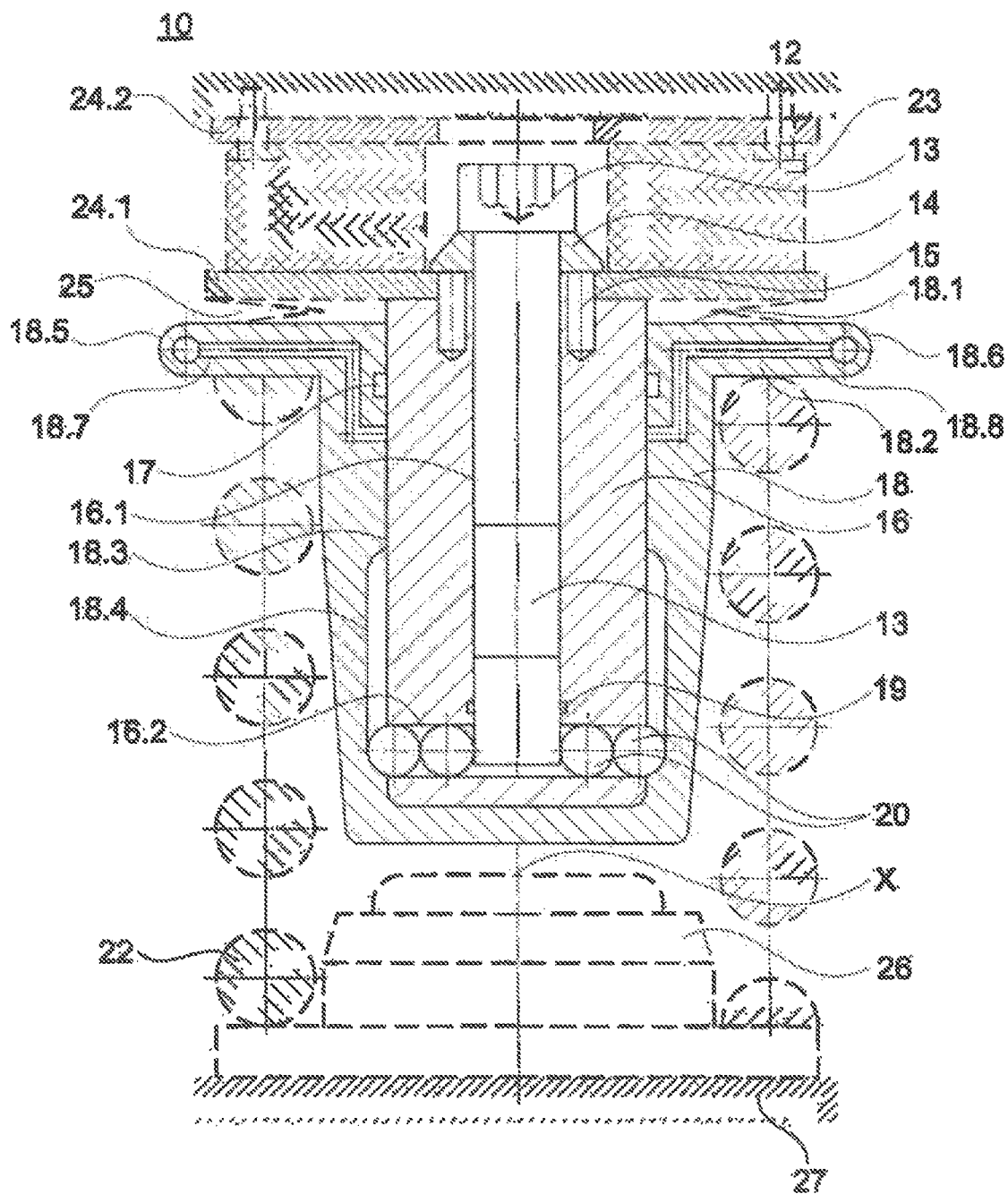
FIG. 2 shows a schematic sectional view of the exemplary embodiment according to FIG. 1.

FIG. 2 shows a schematic sectional view of the exemplary embodiment according to FIG. 1.

Compared to the illustration from FIG. 1, the internal structure of the level control piston 16 and of the level control cylinder 18 is additionally apparent from FIG. 2.

Below the holding disk 14, the pins 15 are shown which extend through the first fixing disk 24.1 into the level control piston 16.

Using the pins 15, a rotational relative movement between the level control piston 16 and the first fixing disk 24.1 can be prevented.

A rotational stop between the first fixing disk 24.1 and the level control piston 16 is provided using the pins 15.

The pins 15 likewise serve for the correct positioning of the first fixing disk 24.1 in relation to the multi-layer spring 23.

The level control piston 16 is configured with a substantially constant or uniform outer diameter over its entire longitudinal extent.

The level control piston 16 has no collar, collar-like shoulder or the like.

The level control piston 16 is designed with an almost identical or constant outer diameter over the entire longitudinal extent.

A simple, inexpensive design of the level control piston 16 is thus provided.

Furthermore, in the retracted state, the level control piston 16 may optionally be entirely or at least substantially retracted into or received in the level control cylinder 18.

A minimal structural height of the level control system 10 can be achieved using the collarless level control piston 16 with constant outer diameter.

The minimal structural height of the exemplary embodiment according to FIGS. 1 and 2 is optionally achieved when the first multi-layer spring 24.1 lies entirely or almost on the collar-like shoulder 18.2 of the level control cylinder 18.

In its compressed state, the compressible and expandable bellows 25 may advantageously plunge entirely into a ring-shaped cutout of the first fixing disk 24.1 or of the collar-like shoulder 18.2.

Thus, using the level control piston 16 with a substantially constant diameter, a significant reduction in the structural space can be achieved, in particular in the region between the first fixing disk 24.1 and the open cylinder side 18.1 or the collar-like shoulder 18.2 of the level control cylinder 18.

The level control piston 16 is movably received in an inner diameter 18.3 of the level control cylinder 18.

Furthermore, the level control piston 16 has a central bore 16.1 in which the fastening element 13 is received.

In FIG. 2, the fastening element 13 is configured as a screw.

The central bore 16.1 of the level control piston 16 at least partially has an internal thread for the screw connection of the fastening element 13.

Furthermore, the central bore 16.1 of the level control piston 16 has a piston seal 19.

The central bore 16.1 or an inner diameter 18.3 of the level control cylinder 18 is thus expediently sealed with respect to the received fastening element 13.

By virtue of the fastening element or the screw 13 being inserted into the central bore 16.1 of the level control piston 16, guide elements 20 are expediently positioned within a receiving bore 16.2 of the level control piston 16.

In particular, the guide elements 20 are positioned in positively locking fashion in the receiving bore 16.2 using the fastening element 13 such that the guide elements 20 at least partially project beyond the outer diameter of the level control piston 16.

The level control cylinder 18 is configured, along the inner diameter 18.3, with guide grooves 18.4 into which the guide elements 20 can project.

A relative movement of the level control piston 16 with respect to the level control cylinder 18 can thus be limited with the aid of the fastening element 13, the guide elements 20 and the guide grooves 18.4.

A relative movement of the level control piston 16 with respect to the lift height or a maximum lift of the level control system 10 can be predefined using the guide grooves 18.4, which can be configured as required.

The level control piston 16 is extended by introducing a fluid into the inner diameter 18.3 of the level control cylinder 18 until the guide elements 20 abut against the grooves 18.4 of the level control cylinder 18.

In this context, an extension movement of the level control piston beyond the maximum intended stroke is prevented by a stop in the form of the guide elements 20 with the groove 18.4 or the grooves 18.4.

The level control piston can be retracted by releasing fluid pressure from the inner diameter 18.3 of the level control cylinder 18 or by applying a vacuum.

The retracting movement of the level control system 10 is ended, that is to say a minimum stroke is reached, as soon as the guide elements 20 again form a stop along the groove 18.4 or the grooves 18.4.

A minimum stroke of the level control piston 16 may likewise be attained when the first fixing disk 24.1 comes into contact with the open cylinder side 18.1.

Alternatively, a minimum stroke may be attained as soon as the level control piston 16 with the level control cylinder 18 comes to a stop at the bottom side.

Furthermore, it is conceivable that the level control piston 16 can be held at a specific height or lifting height by virtue of a specific fluid volume or fluid pressure being enclosed in the inner diameter 18.3 of the level control cylinder 18.

In this context, the level control piston 16 can be positioned along the inner diameter 18.3 of the level control piston 18 in a manner deviating from the stop positions.

Furthermore, using the configuration of the guide grooves 18.4, in interaction with the guide elements 20, a rotational securing action or relative-rotation securing action or a rotational stop can be provided as required.

In particular, using rectilinearly running guide grooves 18.4, a relative rotation of the level control piston 16 with respect to the level control cylinder 16 can be prevented.

A relative-rotation securing action or a rotational securing action can thus be formed in an integral manner using an interaction of the guide elements 20 and correspondingly configured grooves 18.4 of the level control cylinder 18.

A maximum, arbitrarily configurable relative movement between the level control piston 16 and the level control cylinder 18 can be provided.

Provision may be made whereby the grooves 18.4 are designed to provide a linear guide for the level control piston 16.

Furthermore, in the context of disclosed embodiments, an expedient connection of the level control piston 16 to the level control cylinder 18 can be achieved using the single, centrally arranged fastening element 13.

The connection of the level control piston 16 to the level control cylinder 18 is realized indirectly using the fastening element 13 in interaction with the guide elements 20 and the grooves 18.4 of the level control cylinder 18.

Furthermore, a cylinder seal 17 is arranged along the inner diameter 18.3 of the level control cylinder 18.

The cylinder seal 17 enables the inner diameter 18.3 of the level control cylinder 18 to be sealed with respect to the outer diameter of the level control piston 16, wherein the level control piston 16 is movably received in the inner diameter 18.3.

The sealing of the inner diameter 18.3 is provided using the cylinder seal 17 according to FIG. 2 along the sliding surface of the level control piston 16 in the level control cylinder 18.

In FIG. 2, the cylinder seal 17 is configured as an O-ring.

Alternatively, the cylinder seal 17 may be configured as any desired sealing compound or as a ring-shaped sealing compound with any desired cross section. An expedient cylinder seal 17 can be provided.

Using the cylinder seal 17, the inner diameter 18.3 of the level control cylinder is closed off in a fluid-tight manner with respect to the open cylinder side 18.1 of the level control cylinder 18 and in particular with respect to the surrounding atmosphere.

According to the sectional view shown in FIG. 2, the first and second hydraulic connectors 18.5 and 18.6 are arranged so as to tangentially adjoin the collar-like shoulder 18.2 of the level control cylinder 18.

A first and a second fluid channel 18.7 and 18.8 are configured integrally with the level control cylinder 18.

In the collar-like shoulder 18.2, the first and second fluid channels 18.7 and 18.8 extend orthogonally with respect to the longitudinal axis X of the level control cylinder 18.

Thus, the collar-like shoulder 18.2 of the level control cylinder can be configured with a thickness which is large enough to expediently form the first and second fluid channels 18.7 and 18.8 in conjunction with the first and second hydraulic connectors 18.5 and 18.6.

The thickness of the collar-like shoulder 18.2 may accordingly be provided to be so large as to permit the arrangement of first and second fluid channels 18.7 and 18.8, and also first and second hydraulic connectors 18.5 and 18.6, which must be configured expediently.

Furthermore, the first and second fluid channels 18.7 and 18.8 are integrated at least in certain portions in the cylinder wall of the level control cylinder 18.

The first hydraulic connector 18.5 is connected in terms of flow via the first fluid channel 18.7 to the inner diameter 18.3 of the level control cylinder 18.

The second hydraulic connector 18.6 is connected in terms of flow via the second fluid channel 18.8 to the inner diameter 18.3 of the level control cylinder 18.

The first and second fluid channels 18.7 and 18.8 according to FIG. 2 thus extend from the hydraulic connectors 18.5 and 18.6 along the collar-like shoulder 18.2 and through a part of the cylinder wall of the level control cylinder 18, in particular in certain portions in the vertical direction according to FIG. 2.

Furthermore, the first and second fluid channels 18.7 and 18.8 according to FIG. 2 are of substantially Z-shaped configuration.

Furthermore, the first and second fluid channels 18.7 and 18.8 according to FIG. 2 open, beyond the cylinder seal 17, into the inner diameter 18.3 of the level control cylinder 18.

In particular, the first and second fluid channels 18.7 and 18.8 open into the inner diameter 18.3 on that side of the cylinder seal 17 which faces away from the open cylinder side 18.1.

Grooves or flutes may furthermore be provided along the inner diameter 18.3 of the level control cylinder 18 or along the outer diameter of the level control piston 16, such that the fluid can expediently flow into the inner diameter 18.3 from the fluid channels 18.7 and 18.8.

The cylinder seal 17 may for example be provided to have such elasticity that such grooves or flutes along the outer diameter of the level control piston 16 can expediently be sealed using the cylinder seal 17.

Using the configuration of the fluid channels 18.7 and 18.8 as required, it is conceivable that the fluid channels open into the inner diameter 18.3 of the level control cylinder 18 at any desired position which is expedient in the specific application.

By virtue of in particular the hydraulic connectors 18.5 and 18.6, the fluid channels 18.7 and 18.8, the cylinder seal 17 and the guide grooves 18.4 for the guide elements 20 being configured in the level control cylinder 18, an integral construction of the level control cylinder 18 is realized.

Accordingly, the level control piston 16 can be of relatively simple configuration, in particular with an at least substantially constant outer diameter.

Furthermore, the tangential arrangement of the hydraulic connectors 18.5 and 18.6 on the fixed level control cylinder 18 realizes a space-saving arrangement and also avoids the risk of a breakaway of an external fluid line.

Figure 3:
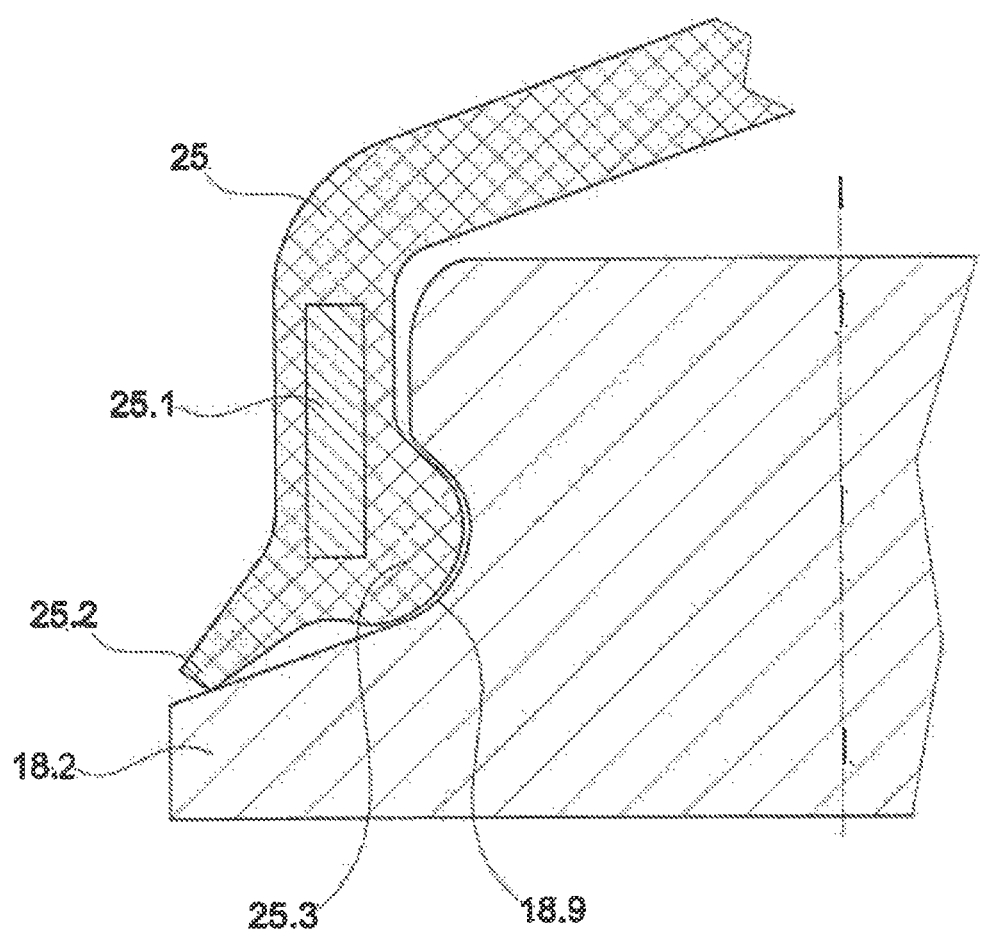
FIG. 3 shows a schematic detail view of the exemplary embodiment according to FIG. 1, with a bellows fastened to the level control cylinder.

FIG. 3 shows a detail view of the exemplary embodiment according to FIG. 1 with a bellows 25 detachably and rotatably fastened to the level control cylinder 18.

Furthermore, the bellows 25 is also detachably and rotatably fastened (not shown in FIG. 3) to the first fixing disk 24.1 in a manner corresponding to the fastening to the level control cylinder 18.

The bellows 25 has a stiffening element 25.1 which is of ring-shaped configuration and which has a rectangular cross section.

The stiffening element 25.1 is entirely integrated into the wall of the bellows 25.

Using the stiffening element 25.1, the bellows 25 has a side wall termination which is suitable for expedient engagement into an encircling receiving groove 18.9 of the collar-like shoulder 18.2 of the level control cylinder 18.

Furthermore, the first fixing disk 24.1 has a receiving groove 24.3 which corresponds to the receiving groove 18.9 of the collar-like shoulder 18.2 of the level control cylinder 18 and which likewise serves for receiving the bellows 25.

In this way, a further side wall termination of the bellows is likewise suitable for expedient engagement into the circumferential receiving groove 24.3 of the first fixing disk 24.1.

Using the stiffening element 25.1, expedient respective local stiffening of the bellows can be provided.

Furthermore, the stiffening element 25.1 has a shaping effect on the bellows 25, in particular along the side wall termination for engagement into the respective receiving groove 18.9 and 24.3.

The bellows 25 can engage securely and detachably into the respective receiving groove 18.9, 24.3 of the level control cylinder 18 and of the first fixing disk 24.1.

In this way, using the stiffening element 25.1, an integrated stiffening function for stabilizing the bellows 25 and an integrally configured securing function are provided.

In particular, the bellows 25 may be formed, in the region of the stiffening element 25.1, with a bead 25.3 which is suitable for engagement into the receiving groove 18.9, 24.3 of the level control cylinder 18 and of the first fixing disk 24.1.

The bead 25.3 is designed such that a possible rotation of the cylinder 18 does not lead to twisting of the bellows 25.

Furthermore, the bellows 25 has a sealing lip 25.2 which projects outward in the circumferential direction.

The sealing lip 25.2 is intended to prevent dirt between the bead 25.3 and the respective receiving groove 18.9, 24.3 from impeding the rotational smooth movement of the collar-like shoulder 18.2 of the level control cylinder 18.

Using the sealing lip 25.2, contamination or some other ingress of foreign bodies under the bellows 25, into the region of the sliding surface between level control piston 16 and level control cylinder 18, is also prevented.

In summary, disclosed embodiments constitutes an integral construction in order to realize a space-saving configuration and also functional characteristics of the system in a simple manner.

Furthermore, the centrally arranged fastening element 13 permits a simple, secure and expedient connection of the level control piston 16 to the level control cylinder 18. Furthermore, the arrangement and fastening of a bellows 25 can be achieved in a simple and inexpensive manner using an integral construction of the level control cylinder 18 and of the bellows 25.

In general, the arrangement of the fastening element 13 within the multi-layer spring 23 and the configuration of the level control piston 16 with a uniform diameter and with its guide elements 20 in conjunction with the level control cylinder 18 and its guide groove 18.4 or guide grooves 18.4 in the form of an integrally functional configuration constitutes a both space-saving and functionally advantageous solution.

Finally, disclosed embodiments is able to provide an integral construction of a level control system 10, such that significant advantages can be achieved both in installation, servicing and during operation.

REFERENCE DESIGNATIONS

10 Level control system
12 Car body (of a rail vehicle)
13 Fastening element
14 Holding disk
15 Pin
16 Level control piston
16.1 Central bore
16.2 Receiving bore
17 Cylinder seal
18 Level control cylinder
18.1 Open cylinder side
18.2 Collar-like shoulder
18.3 Inner diameter
18.4 Guide groove
18.5 First hydraulic connector
18.6 Second hydraulic connector
18.7 First fluid channel
18.8 Second fluid channel
18.9 Receiving groove
19 Piston seal
20 Guide element
22 Spiral spring
23 Multi-layer spring
24.1 First fixing disk
24.2 Second fixing disk
24.3 Receiving groove
25 Bellows
25.1 Stiffening element
25.2 Sealing lip
25.3 Bead
26 Stop buffer
27 Running gear
X Longitudinal axis (of the level control cylinder and of the level control piston)

The invention claimed is:

1. A level control system for adjusting the level of a rail vehicle, the system comprising:
   at least one level control cylinder having an open cylinder side facing, and movable relative to, a first fixing disk and a closed cylinder side at an end opposite the first fixing disk; and
   one level control piston,
   wherein the level control piston is at least partially movably received in the at least one level control cylinder,
   wherein the level control piston has a substantially continuous outer diameter,
   wherein the at least one level control cylinder has at least one collared shoulder along the open cylinder side, wherein the collared shoulder has at least one first radially or tangentially arranged hydraulic connector and at least one second radially or tangentially arranged hydraulic connector, and
   wherein a single fastening element is provided for connecting the level control piston to the at least one level control cylinder so that level control piston moves with the first fixing disk relative to the at least one level control cylinder.

2. The level control system of claim 1, wherein the level control system has at least one multi-layer spring which, in an installed state, is arranged above and/or below the at least one level control cylinder.

3. The level control system of claim 1, wherein the level control piston has a central bore which is designed for receiving the fastening element.

4. The level control system of claim 1, wherein the level control system has the first fixing disk and a second fixing disk, and wherein the first fixing disk is arranged on the level control piston and the second fixing disk is arranged on a car body of the rail vehicle.

5. The level control system of claim 4, wherein a multi-layer spring is arranged between the first and second fixing disks.

6. The level control system of claim 4, wherein a multi-layer spring is arranged around the fastening element in order to connect the first fixing disk to the second fixing disk.

7. The level control system of claim 4, wherein the first fixing disk is a circular-ring-shape.

8. The level control system of claim 1, further comprising at least one bellows which is arranged between the collared shoulder of the at least one level control cylinder and the first fixing disk.

9. The level control system of claim 8, wherein the collared shoulder of the at least one level control cylinder and/or the first fixing disk has a receiving groove for receiving the bellows.

10. The level control system of claim 8, wherein the at least one bellows has a stiffening element such that the bellows is detachably fixed in a receiving groove of the at least one level control cylinder and/or of the first fixing disk.

11. The level control system of claim 1, further comprising at least one guide element is provided which, in conjunction with the fastening element, is positioned such that the at least one level control cylinder provides a first and a second end stop for a relative movement of the level control piston with the at least one guide element.

12. The level control system of claim 11, wherein the at least one guide element provided so as to project out of the level control piston such that the guide element engages into a corresponding guide groove of the at least one level control cylinder in order to provide a predefinable relative movement between the level control piston and the at least one level control cylinder.

13. The level control system of claim 12, wherein the guide element and the corresponding guide groove interact as a linear guide for the level control piston such that the level control piston, at its maximum stroke, can be caused to abut axially against the first end stop and, at its minimum stroke, can be caused to abut axially against the second end stop and is received movably in the at least one level control cylinder so as to be secured against rotation.

14. The level control system of claim 13, wherein the fastening element is a screw or a bolt.

* * * * *